United States Patent
Staggs et al.

(10) Patent No.: US 9,635,029 B2
(45) Date of Patent: Apr. 25, 2017

(54) ROLE-BASED ACCESS CONTROL PERMISSIONS

(71) Applicant: Honeywell International Inc., Morristown, NJ (US)

(72) Inventors: Kevin P. Staggs, Peoria, AZ (US); Thomas R. Markham, Fridley, MN (US); Julie J. Hull Roskos, Forest Lake, MN (US); Alexander Chernoguzov, Warrington, PA (US)

(73) Assignee: Honeywell International Inc., Morris Plains, NJ (US)

( * ) Notice: Subject to any disclaimer, the term of this patent is extended or adjusted under 35 U.S.C. 154(b) by 41 days.

(21) Appl. No.: 13/682,428

(22) Filed: Nov. 20, 2012

(65) Prior Publication Data
US 2013/0198799 A1    Aug. 1, 2013

Related U.S. Application Data

(60) Provisional application No. 61/591,675, filed on Jan. 27, 2012.

(51) Int. Cl.
*H04L 29/06*    (2006.01)
*G06F 21/62*    (2013.01)

(52) U.S. Cl.
CPC .......... *H04L 63/10* (2013.01); *G06F 21/6218* (2013.01); *H04L 63/105* (2013.01);
(Continued)

(58) Field of Classification Search
None
See application file for complete search history.

(56) References Cited

U.S. PATENT DOCUMENTS 7,735,116 B1    6/2010  Gauvin
8,024,568 B2 *  9/2011  Rao et al. ............. 713/168
(Continued)

OTHER PUBLICATIONS

Ferraiolo, Cugini, Kuhn "Role Based Access Control:Features and Motivations". Computer Security Applications Conference, 1995, National Institute of Standards and Technology, US Department of Commerce, p. 1-8.*

(Continued)

*Primary Examiner* — Jeffery Williams
(74) *Attorney, Agent, or Firm* — Brooks, Cameron & Huebsch, PLLC

(57) ABSTRACT

Devices, systems, and methods for role-based access control permissions are disclosed. One method includes a policy decision point that receives up-to-date security context information from one or more outside sources to determine whether to grant access for a data client to a portion of the system and creates an access vector including the determination; receiving, via a policy agent, a request by the data client for access to the portion of the computing system by the data client, wherein the policy agent checks to ensure there is a session established with communications and user/application enforcement points; receiving, via communications policy enforcement point, the request from the policy agent, wherein the communications policy enforcement point determines whether the data client is an authorized node, based upon the access vector received from the policy decision point; and receiving, via the user/application policy enforcement point, the request from the communications policy enforcement point.

20 Claims, 2 Drawing Sheets

(52) U.S. Cl.
CPC .. *G06F 2221/2141* (2013.01); *H04L 63/0823* (2013.01); *H04L 63/101* (2013.01)

(56) References Cited

U.S. PATENT DOCUMENTS

| | | | |
|---|---|---|---|
| 2006/0089932 A1 | 4/2006 | Buehler et al. | |
| 2007/0050842 A1 | 3/2007 | Smith et al. | |
| 2007/0283443 A1 | 12/2007 | McPherson et al. | |
| 2008/0104665 A1* | 5/2008 | Naldurg et al. | 726/2 |
| 2008/0168532 A1* | 7/2008 | Carter et al. | 726/1 |
| 2009/0254392 A1* | 10/2009 | Zander | 705/7 |
| 2010/0125574 A1* | 5/2010 | Navas | 707/722 |
| 2010/0125893 A1* | 5/2010 | Kumar et al. | 726/4 |
| 2011/0231900 A1* | 9/2011 | Shimoe | 726/1 |
| 2012/0311658 A1* | 12/2012 | Dozier | 726/1 |

OTHER PUBLICATIONS

Mavridis et al., "Access control based on attribute certificates for medical intranet applications", J Med Internet Res. Jan.-Mar. 2001, 3(1):E9; Mar. 17, 2001, p. 1-12.*

Search Report for related EP Application No. 12 193 583.7-1956, dated May 8, 2013, 9 pgs.

Wilikens, et al. "A context-related authorization and access control method based on RBAC", Proceedings of the Seventh ACM Symposium on Access Control Models and Technologies, SACMAT '02, Jan. 1, 2002, 8 pgs., (XP055058115).

Burgner, et al. "Using Multi-Level Role Based Access Control for Wireless Classified Environments", Proceedings of the World Congress on Engineering and Computer Science, vol. II, Jan. 19, 2011 (XP002694617), 5 pgs.

* cited by examiner

ROLE-BASED ACCESS CONTROL PERMISSIONS

GOVERNMENT RIGHTS

This invention was made with Government support under Agreement DE-OE0000544 awarded by US Department of Energy. The Government has certain rights in this invention.

TECHNICAL FIELD

The present disclosure relates to role-based access control permissions.

BACKGROUND

To gain access to a secure system (e.g., an industrial control system) a user (e.g., operator, employee, supervisor, administrator, and/or auditor) may be granted certain permissions (e.g., access rights, privileges, etc.) which may allow the user to access particular areas of the system.

Current approaches to granting permissions may include assigning permissions on a per-user basis (e.g., via passwords and/or user IDs). Such an approach may involve a static configuration of a list (e.g., map) associating users with permissions. However, such a list may be prohibitively detailed, and/or may overallow access in particular cases. Further, such a list may be difficult to update and may thus be updated infrequently.

For example, if an employee is terminated, current approaches may still allow the employee access to the system for a long period of time, thereby producing a number of security risks, for instance. As an additional example, if an employee advances in training, current approaches may cause granted permissions to lag behind the employee's job description, abilities, and/or skills.

DETAILED DESCRIPTION

Figure 1:
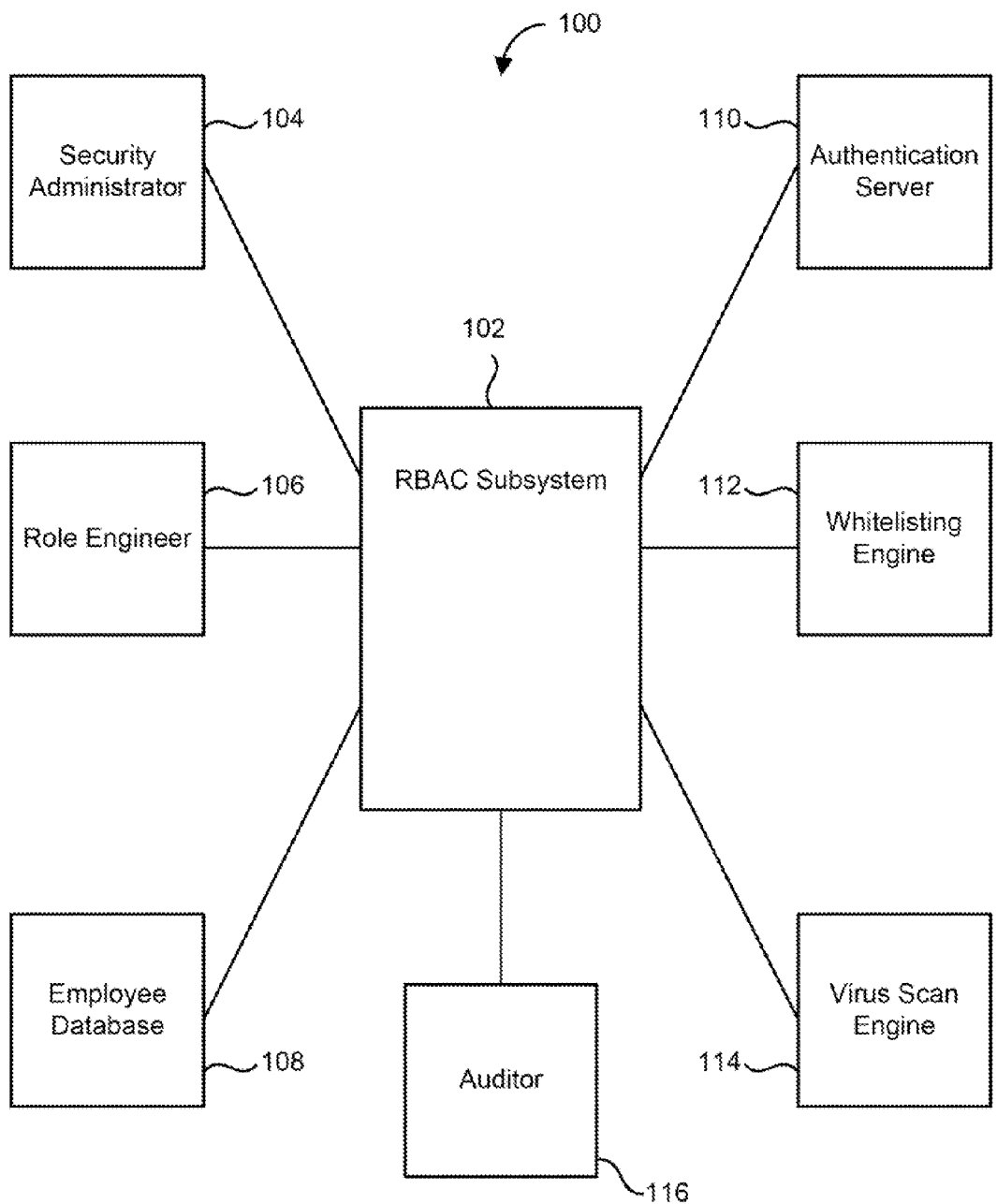
FIG. 1 illustrates a flow chart associated with role-based access control permissions in accordance with one or more embodiments of the present disclosure.

Role-based access control permissions are described herein. Embodiments in accordance with the present disclosure can allow for the binding of permissions to objects (e.g., process controllers, network devices, network points, point parameters, etc.) after access to the system (e.g., a portion of the system) is requested. Accordingly, in various implementations, embodiments of the present disclosure can reduce (e.g., eliminate) the need to maintain a list and/or map associating users with permissions, for instance. In various embodiments, a role template can be assigned to a number of sets of operations. Further, a role can be set up and a scope of responsibility associated with the role can be defined. Accordingly, the sets of permissions can be known, and the objects to be operated on can subsequently be bound to permissions.

Role, as used herein, can refer to a job function and/or can be associated with a set of permissions (e.g., legitimate operations). Roles can have attributes including, for example, "name" and/or "type" (e.g., reflecting job function types such as "manager," "engineer," and/or "operator"), "security level," "professional requirements," "direct superior roles" and/or "direct subordinate roles," among others. Object, as used herein, can refer to resources protected by access control and can have attributes including, for example, "id," "type," "security level," and/or "state," among others.

Embodiments in accordance with the present disclosure can create a role and/or change rights associated with an existing role by creating an access vector for a data client (e.g., user interface) on a network responsive to a desired (e.g., authorized) permission level. For example, a user's changing qualifications (e.g., due to employee training) can grant the user a greater (e.g., more exclusive) permission level. By way of example and not limitation, additional examples of factors bearing on a user's permission can include location, type of user device, qualifications, employer, and/or time (e.g., time of day, work windows, etc.) among others. These factors can change on a regular basis, and embodiments of the present disclosure can allow permissions to adapt accordingly (e.g., substantially in real-time).

Further, embodiments of the present disclosure can increase security of a system by creating and/or altering permission levels responsive to various events. For example, in an event where an employee of an oil refinery is terminated, embodiments of the present disclosure can likewise terminate the employee's permission to various layers of the refinery operations. Such responsiveness can, for example, reduce the security threat posed by a nefarious entity (e.g., a disgruntled ex-employee) attempting to sabotage and/or otherwise harm the system.

Additionally, embodiments of the present disclosure can create a role, identify access rights for a role, associate a Lightweight Directory Access Protocol (LDAP) user account with a role, register devices into a system, modify and/or remove devices from a system, assign user(s) to role(s), add and/or remove a user from a system, etc.

Permission-based access by a client to a system (e.g., a server) can be controlled (e.g., enforced) in accordance with embodiments of the present disclosure through the use of three levels (e.g., layers). First, a node-to-node level (e.g., node layer) can refer generally to machine-to-machine communication. The node layer can be used to assign a role to a machine and can be used to determine machines that are allowed to communicate with each other (e.g., via Internet Protocol Security (IPsec)). Node-layer access control can be performed by communications policy enforcement point 228, discussed below in connection with FIG. 2.

Second, an application layer can be used to determine whether a specific software application has permission to access a portion of a system. For example, the application layer can determine that a user is accessing a database of the server using the correct client software application rather than accessing the database by circumventing the correct application (e.g., via telnet).

Third, a role layer can be used to define permissions associated with a user. The role layer can identify the user and/or can determine whether a user has permission to access a particular object within the system.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of users" can refer to one or more users.

FIG. 1 illustrates a flow chart 100 associated with role-based access control permissions in accordance with one or more embodiments of the present disclosure. As shown in FIG. 1, system 100 includes Role-Based Access Control (RBAC) subsystem 102. RBAC subsystem 102 can perform various functions associated with controlling access to a system based on one or more roles. Those functions include functions such as, for example, those discussed above (e.g., create a role and/or associate access rights with a role). RBAC subsystem 102 can communicate (e.g., via one or more wired and/or wireless network connections) with various external systems.

External systems can include, for example, security administrator 104, role engineer 106, employee database 108, authentication server 110, whitelisting engine 112, virus scan engine 114, and/or auditor 116, among others (not illustrated in FIG. 1).

RBAC subsystem 102 can receive audit logs and/or security policies from security administrator 104 and/or role engineer 106. Security policies can include, for example, system-level security strategies, procedures, guidelines, etc. In an example, security policies can refer to a formalism of a role engineer's tacit knowledge about access control based on the attributes of relevant entities, including, for example, subjects, objects, and/or relations between these and/or others.

RBAC subsystem 102 can receive qualification information relating to a number of users (e.g., employees associated with the system) from employee database 108. Qualification information can include skill(s) of the user(s), as well as professional certifications, and other qualifications (e.g., job qualifications). Such information can be contained in training records, for instance.

RBAC subsystem 102 can receive a user authentication token from authentication server 110. An authentication token can include information indicating that the user has been authenticated to the system (e.g., via a user ID and/or password, among others).

RBAC subsystem 102 can receive a whitelisting state and/or application hash from whitelisting engine 112. A whitelisting state can indicate an application presence or absence on a whitelist associated with the system.

RBAC subsystem 102 can receive an antivirus state from virus scan engine 114. An antivirus state can include, for example, an indication that a device associated with the user has been scanned for viruses (e.g., malware, Trojans, worms, etc.) and/or that the device has been found to be free of viruses.

RBAC subsystem 102 can communicate information such as, for example, audit logs, security policies, training records, and other information to auditor 116. Auditor 116 can monitor the system for access records, system usage, permissions, etc.

Figure 2:
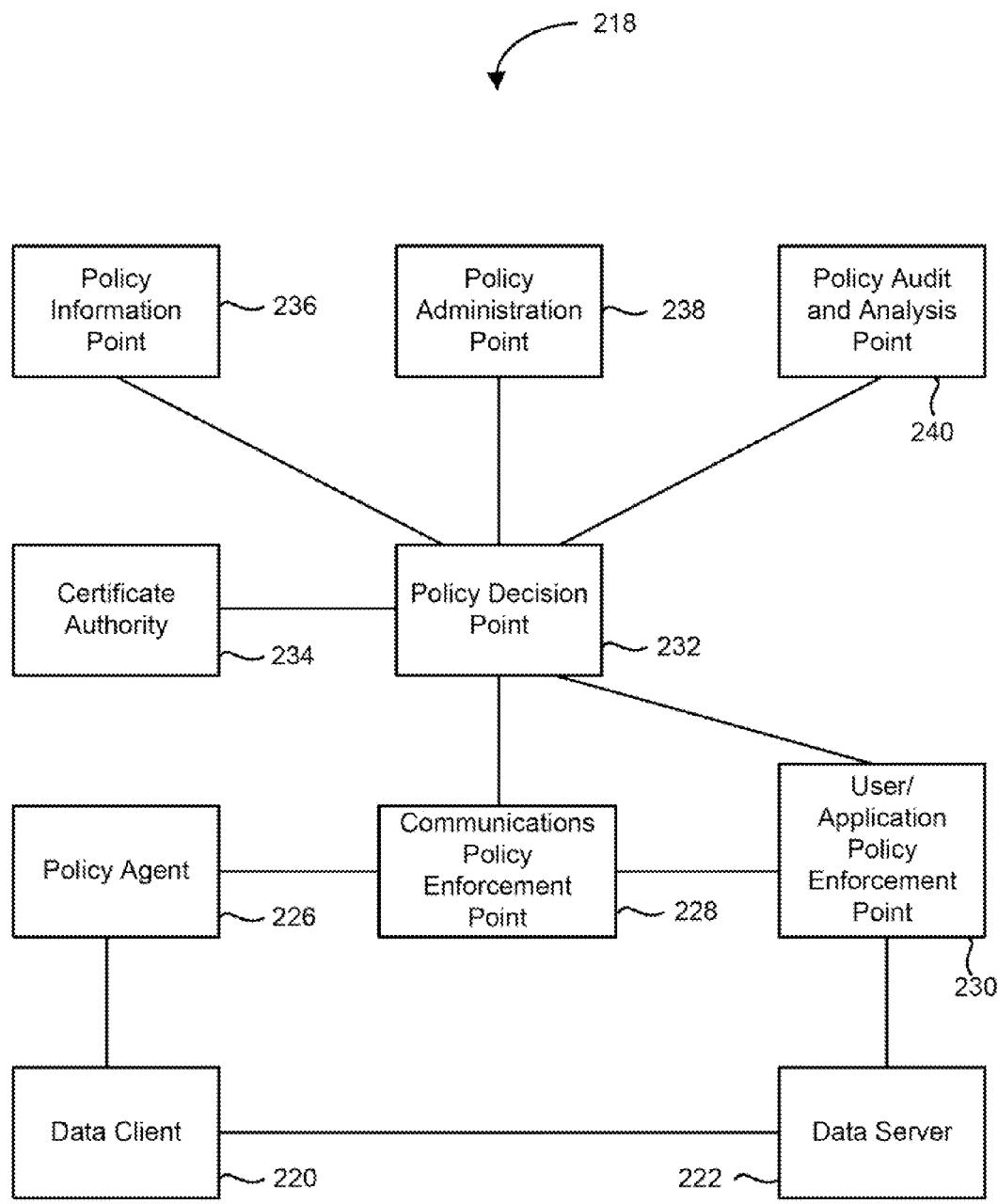
FIG. 2 illustrates another flow chart associated with role-based access control permissions in accordance with one or more embodiments of the present disclosure.

FIG. 2 illustrates a flow diagram associated with role-based access control permissions in accordance with one or more embodiments of the present disclosure. Flow diagram 218 can be performed on a number of computing devices (e.g., operator stations, servers, etc.) forming a network, for instance.

As shown in FIG. 2, flow diagram 218 includes a data client 220. Data client 220 can be a user interface, for instance. Data client 220 can request access to a portion of a system (e.g., data server 222) via a policy agent 226.

A communications policy enforcement point can be utilized for checking for an existing access vector that indicates the data client has access to the portion of the computing system requested, based upon the access vector received from the policy decision point. For example, node level access control can be enforced by the communications policy enforcement point 228. If the data client 220 node is authorized to communicate with the data server 222 node the communications policy enforcement point 228 associated with the data server 222 will allow network traffic to flow from the policy agent 226 to the user/application policy enforcement point 230.

As discussed above, a policy agent 226 can be utilized, for example, to receive a request by the data client for access to a portion of a computing system (e.g., data server 222) by the data client 220. Policy agent 226 can receive this request from the data client 220 and forward it to the user/application policy enforcement point 230 which then checks for an existing access vector allowing data client access to data server 222.

In some embodiments, a user/application policy enforcement point can be utilized for receiving the request from the communications policy enforcement point, wherein the user/application policy enforcement point determines whether the data client is using a proper application and the user is authorized, based upon the access vector received from the policy decision point. If the user/application policy enforcement point 230 determines that there is an existing access vector granting access to this use/application pair, data client 220 can access data server 222.

If there is not an existing access vector, policy decision point 232 can determine a whitelist status of data client 220 (previously discussed) and/or an antivirus state of data client 220 (previously discussed). Further, user/application policy enforcement point 230 with support from policy decision point 232 can check an ID (e.g., unique identification information, such as system assigned identification information, LDAP token, etc.) of a user associated with data client 220 to determine that the user is valid (e.g., authenticated and authorized to access data server 222).

In some embodiments, provided the whitelist status, antivirus state, and user ID are determined to be adequate (approved by policy) the request can be communicated through the user/application policy enforcement point to the data server.

It should be understood by the reader that the user/application and/or communication enforcement points can be provided in a data server or provided in-line with the data server to receive input and/or output with the data server.

Policy decision point 232 can receive information from outside sources such as certificate authority 234 (e.g., certificate revocation lists), policy information point 236 (e.g., policy constraints), and/or policy administration point 238 (e.g., policy configuration). Although not shown in FIG. 2, policy decision point 232 can be communicatively coupled to an LDAP (previously discussed).

A policy decision point can be utilized to receive up-to-date security context information from one or more outside sources to determine whether to grant access for a data client to a portion of the system and creates an access vector including the determination. For example, policy decision point 232 can use the information from the outside sources 234, 236, and/or 238 to determine a role and/or create an access vector for mediating data client 220 access data server 222. A notification associated with the creation of the access vector can be communicated to user/application policy enforcement point 230, which can subsequently allow data client 220 access to data server 222 via the access vector.

Policy decision point 232 can also communicate access logs to policy audit and analysis point 240. Access logs can maintain a list of vectors created and/or can maintain a list of attempts at access that were blocked by a vector. For example, if a nefarious entity is attempting to gain access, logging of attempts that were blocked by a vector can, for example, indicate the intentions of the entity.

Embodiments of the present disclosure include both push-type and pull-type concepts. For example, in a pull-type embodiment, the user/application policy enforcement point requests an access vector from the policy decision point (e.g., pulling the data from the policy decision point). Under a push-type embodiment, the policy decision point can push a created access vector to the policy enforcement point (without the policy enforcement point sending a request). Both the push and pull-type embodiments support late binding in that the current state of the system (e.g., anti-virus state, white listing state, data from the policy information point) is used to create the access vector based upon current state (i.e., up-to-date information) as opposed to the state of the system when an administrator specified the policy.

In such embodiments, the access vector can be created, potentially long after the administrator has set the access policy. This can be accomplished by taking into account the up-to-date security context (e.g., antivirus, white list, and other data from a policy information point). This can all be current information which can be incorporated into a created access vector.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for providing role-based access control permissions, comprising:
   executing, by a processor, instructions stored on a memory to receive up-to-date security context information from one or more outside sources, including a certificate authority;
   executing, by the processor, instructions stored on the memory to receive a request made by a user interface for access to a portion of an industrial control system by the user interface;
   executing, by the processor, instructions stored on the memory to create an access vector responsive to the request for access;
   executing, by the processor, instructions stored on the memory to check to ensure there is a session established with a communications enforcement point and a user/application enforcement point;
   executing, by the processor, instructions stored on the memory to determine whether the user interface is an authorized node based upon the access vector;
   executing, by the processor, instructions stored on the memory to determine whether the user interface is using a proper application and whether the user is authorized, based upon the access vector;
   maintaining the access vector in a list of access vectors created; and
   maintaining a list of attempts to access the portion of the industrial control system that were blocked by a vector.

2. The method of claim 1, wherein the method includes executing, by the processor, instructions stored on the memory to communicate one or more access logs to a policy audit point wherein the access logs include at least one of: the list of vectors created and a list of attempts at access that required the creation of a vector.

3. The method of claim 1, wherein the method includes executing, by the processor, instructions stored on the memory to use information from the outside sources to determine the security context.

4. The method of claim 1, wherein the method includes executing, by the processor, instructions stored on the memory to:
   communicate by pushing the access vector to the user/application policy enforcement point or the communications policy enforcement point; and
   allow the user interface access to the portion of the industrial control system based on the access vector.

5. The method of claim 1, wherein the method includes executing, by the processor, instructions stored on the memory to:
   communicate, via the user/application policy enforcement point or the communications policy enforcement point by pulling the access vector from the policy decision point, wherein the access vector defines the access; and
   allowing access by the user interface to the portion of the computing system based on the access vector responsive to a determination to grant access by each of:
   the communications policy enforcement point; and
   the user/application policy enforcement point.

6. The method of claim 1, wherein executing, by the processor, instructions stored on the memory to receive up-to-date security context information from one or more outside sources includes executing, by the processor, instructions stored on the memory to receive information from one or more of a certificate authority, a policy information point, and a policy administration point.

7. The method of claim 1, wherein the method includes executing, by the processor, instructions stored on the memory to determine a whitelist status of the user interface.

8. The method of claim 1, wherein the method includes executing, by the processor, instructions stored on the memory to determine an antivirus state of the user interface.

9. The method of claim 1, wherein the method includes executing, by the processor, instructions stored on the memory to check identification information of the user to determine that the user is authorized to be using the user interface.

10. The method of claim 1, wherein the method includes executing, by the processor, instructions stored on the memory to determine that there is not an existing access vector, and, based on that determination, determining at least one of a whitelist status of the user interface and an antivirus state of the user interface.

11. A system for providing role-based access control permissions, comprising:
 a processor; and
 a memory having instructions stored thereon executable by the processor to:
  receive up-to-date security context information from one or more outside sources, including a certificate authority, to determine whether to grant access for a user interface to a portion of an industrial control system and create an access vector including the determination responsive to a request for access to a portion of the system made via the user interface;
  check to ensure there is a session established with a communications enforcement point and a user/application enforcement point;
  determine whether the user interface is an authorized node based upon the access vector;
  determine whether the user interface is using a proper application and the user is authorized, based upon the access vector
  maintain the access vector in a list of access vectors created; and
  maintain a list of attempts to access the portion of the industrial control system that were blocked by a vector.

12. The system of claim 11, wherein the system includes a Lightweight Directory Access Protocol server.

13. The system of claim 11, wherein the system includes an application level access control component.

14. The system of claim 11, wherein the instructions are executable to receive at least one of the following information types: audit logs, security policies, and training records and use the at least one information type to monitor the system for at least one of: access records, system usage, and access permissions.

15. The system of claim 11, wherein the instructions are executable as a part of a node-layer access control.

16. The system of claim 11, wherein the instructions are executable as part of a user and application access control.

17. A non-transitory computer readable medium having computer readable instructions stored thereon that are executable by a processor to:
 receive, via a policy agent, a request by a user interface for access to a portion of an industrial control system by the user and checking for an existing access authorization that indicates the user has access to the portion of the industrial control system requested;
 receive, via a user/application policy enforcement point, the request from a communications policy enforcement point, wherein the user/application policy enforcement point determines whether the user is using a proper application;
 receive, via a policy decision point, the request from the user/application policy enforcement point, wherein the policy decision point receives information from one or more outside sources, including a certificate authority;
 create, via the policy decision point, an access vector responsive to the request for access;
 determine, via a communications policy enforcement point, whether the user interface is an authorized node based upon the access vector
 maintain the access vector in a list of access vectors created; and
 maintain a list of attempts to access the portion of the industrial control system that were blocked by a vector.

18. The computer readable medium of claim 17, wherein the instructions are executable by the processor to enable the policy decision point to process the security context which includes one or more of a whitelist status, antivirus state, and user identification and wherein the policy decision point communicates the access vector to the at least one of the user/application policy enforcement point and communications policy enforcement point.

19. The computer readable medium of claim 17, wherein the instructions are executable by the processor to receive security context information including at least one of whitelisting and antivirus information wherein whitelisting information includes at least one of whitelisting state and an application hash from a whitelisting engine, wherein the whitelisting state indicates a software application presence or absence on a whitelist associated with the system and wherein antivirus information includes an antivirus state from a virus scan engine and wherein the antivirus state includes an indication that a device associated with a user has been scanned for viruses or that the device has been found to be free of viruses.

20. The computer readable medium of claim 17, wherein the instructions are executable by the processor to receive a user authentication token from authentication server and wherein the authentication token includes information indicating that the user has been authenticated to the system.

* * * * *